(12) United States Patent
Valpard

(10) Patent No.: US 9,405,580 B2
(45) Date of Patent: Aug. 2, 2016

(54) METHOD OF SEQUENCING ON A MULTICORE PROCESSOR

(71) Applicant: SAGEM DEFENSE SECURITE, Boulogne-Billancourt (FR)

(72) Inventor: Christian Valpard, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 14/356,933

(22) PCT Filed: Nov. 8, 2012

(86) PCT No.: PCT/EP2012/072184
§ 371 (c)(1),
(2) Date: May 14, 2014

(87) PCT Pub. No.: WO2013/068494
PCT Pub. Date: May 16, 2013

(65) Prior Publication Data
US 2014/0310823 A1    Oct. 16, 2014

(30) Foreign Application Priority Data
Nov. 10, 2011    (FR) ...................................... 11 60274

(51) Int. Cl.
*G06F 9/48*   (2006.01)
*G06F 9/50*   (2006.01)
*G06F 21/62*  (2013.01)
(52) U.S. Cl.
CPC ............ *G06F 9/4887* (2013.01); *G06F 9/4843* (2013.01); *G06F 9/5061* (2013.01); *G06F 21/629* (2013.01)

(58) Field of Classification Search
CPC ...................................................... G06F 9/4887
See application file for complete search history.

(56) References Cited

U.S. PATENT DOCUMENTS

| 2010/0100706 A1* | 4/2010 | Inoue et al. ..................... 712/30 |
| 2010/0199280 A1  | 8/2010 | Vestal et al. |
| 2011/0055518 A1* | 3/2011 | Hotra .................... G06F 9/5061 712/29 |

OTHER PUBLICATIONS

Easwaran, et al., A Compositional Framework for Avionics, 2009, Technical Reports (CIS), Paper 898, pp. 1-14.*
Camara et al., Model Extraction for ARINC 653 Based Avionics Software, 2007, Springer-Verlag Berlin Heidelberg, SINP 2007, LNCS 4595, pp. 243-262.*
Joyce L Tokar, Space & Time Partitioning with ARINC 653 and pragma Profile, 2003, ADA Letters, vol. XXIII, No. 4, pp. 52-54.*

(Continued)

*Primary Examiner* — Jung Kim
*Assistant Examiner* — Adrian Stoica
(74) *Attorney, Agent, or Firm* — Oliff PLC

(57) ABSTRACT

The present invention relates to the field of real-time executives and their adaptation for secure execution on a multicore processor. There is defined, in addition to the level of certification intrinsic to each task, a level of security relating to the criticality of the execution of the instance of the task in its context and by a method of sequencing distributed over the various cores which make it possible to exchange, during each time interval, the information relating to the level of certification and to the level of security of each of the tasks getting ready to be launched. A decision is then taken on each core for launching the task envisaged as a function of the relevant information received from the other cores.

4 Claims, 3 Drawing Sheets

(56) References Cited

OTHER PUBLICATIONS

Translation of May 22, 2014 International Preliminary Report on Patentability issued in International Patent Application No. PCT/EP2012/072184.

Fuchsen; "How to Address Certification for Multi-core Based IMA Platforms: Current Status and Potential Solutions;" Digital Avionics Systems Conference (DASC); Oct. 3, 2010; XP031816257; pp. 5.E.3-1-5.E.3-11.

Kaiser; "Combining Partitioning Virtualization for Safety-Critical Systems;" 2007; XP002685394; pp. 1-6.

Parkinson; "Safety, Security and Multicore;" Advances in Systems Safety Advances in Systems Safety, Proceedings of the Nineteenth Safety-Critical Systems Symposium; Sep. 8, 2011; XP002685395; pp. 1-18.

Smeed et al; "Commercially Available, DO-178B Level A Certifiable, Hard Partitioned, Posix Compliant Real-Time Operating System and TCP/UDP Compliant Ethernet Stack Software;" XP3196195; pp. 6.A.4-1-6.A.4-9.

Dec. 6, 2012 Search Report issued in International Patent Application No. PCT/EP2012/072184 (with translation).

* cited by examiner

METHOD OF SEQUENCING ON A MULTICORE PROCESSOR

This application claims priority to International Application No. PCT/EP2012/072184, filed on Nov. 8, 2012, and to French Patent Publication No. 11/60274, filed on Nov. 10, 2011, the disclosures of both of which are incorporated herein by reference in their entireties.

The present invention concerns the field of real-time executives known by the acronym RTEs. These RTEs are used in industry where it must be possible to provide a high level of security to a software process. These real-time executives are typically found for managing nuclear power stations, for managing and controlling the various components of aircraft or for managing and controlling sensitive vessels such as attack submarines and others.

In the field of real-time executives, a software concept called partitioning is used. This partitioning is aimed at a static allocation of the resources, including memory and time. The time is typically divided into successive time slots, generally of the same duration. This partitioning aims to enable a set of tasks to be executed on a processor, each task having its own resources called partitions, typically a memory space and a set of reserved time slots. It is then ensured that any problem during the execution of a task in a partition cannot interfere with the correct performance of the other tasks in the other partitions.

This concept is implemented in the form, among others, of a periodic sequencing method that, at regular time intervals, interrupts the current task and manages a switching onto the execution of a new task while ensuring that it will have its resources available; a context switch is then spoken of.

A certification level relating to the development method used for performing a given task that has to be executed in such a system is defined. This certification level therefore defines the care and the development techniques used; it therefore reflects an intrinsic quality level of the software.

Since the concept of partitioning makes it possible to ensure that, in the event of failure of a given task, this failure will not have any impact on the other tasks, it is possible to develop each task with a certification level corresponding to its criticality level. This is particularly advantageous since the cost of the development according to the criteria corresponding to the highest certification level is great.

For example, in the field of avionic embedded software, the standard defining the concept of partitioning is the ARINC 653 standard, while the certification levels are defined by the standards ED-12B and DO-178B.

The latter define five criticality levels or DALs (design assurance levels), from the highest certification level A to the lowest level E.

These standards make it possible to ensure a high level of security for the software developed while controlling the development costs by making it possible to develop each task of the system according to its criticality. These standards are suited to development on a single-core processor where, at a given moment, only one task is functioning.

However, the past few years have seen the development of multicore processors as the main means of continuing the race for computing power of processors. It turns out that current multicore processors do not guarantee impermeability of functioning between the various cores. It is not possible to guarantee that a task being executed on one of the cores and subject to a fault cannot interfere with the correct performance of another task executed on another core. This impermeability, the basic concept of partitioning, does not therefore make it possible to use a simple transposition of the concept of partitioning and certification levels to produce a real-time executive that is secure in the context of a multicore processor.

The invention aims to solve the above problems by defining, in addition to the certification level intrinsic to each task, a security level relating to the criticality of the execution of the instance of the task in its context and by a method of sequencing distributed over the various cores that makes it possible to exchange, during each time slot, the information relating to the certification level and to the level of security of each of the tasks getting ready to be launched. A decision is then taken on each core for launching the task envisaged according to the relevant information received from the other cores.

The invention concerns a method for sequencing a set of tasks on a processor having a plurality of execution cores, the resources of the processor being divided into a plurality of partitions, these partitions sharing the time in the form of a succession of time slots synchronously on each core of the processor, the method being executed by a set of sequencing modules implemented on the processor cores, a control instance being implemented in said sequencing modules, which comprises a preliminary step of defining, for each task instance that is to be executed on the system, a security level relating to the critical character of the execution of the particular instance of the task, each task being moreover provided with a certification level related to the development methods used during its design;

and which comprises, for each partition, a step of exchanging messages between the various sequencing modules of each core in order to form the control instance of the certification and security levels of the tasks getting ready to be executed by the various cores in the current partition and a step of determining a launch authorisation for each of the tasks getting ready to be launched on each core according to the certification and security levels of the other tasks getting ready to be launched in the same partition.

According to a particular embodiment of the invention, the method also comprises, for each partition, a step of updating the security level of the task getting ready to be launched according to the execution context of said tasks.

According to a particular embodiment of the invention, the control instance is centralised in a particular sequencing module on one of the cores and the message exchange step consists of a step of the sending, by each sequencing module, of its information to this sequencing module.

According to a particular embodiment of the invention, the control instance is distributed in the sequencing modules on each core and the message exchange step consists of a step of the sending, by each sequencing module, of its information to all the sequencing modules.

According to a particular embodiment of the invention, the step of determining a launch authorisation for each of the tasks, the security levels being four in number, comprises the following rules:

a task having a security level 1, that is to say the lowest, is executed if the following conditions are met:
  no task with security level 3 or 4 is present on another core for the current partition;
  any task of security level 2 present on another core has a certification level lower than or equal to its own certification level;
a task having a security level 2 is executed if the following conditions are met:
  no task with security level 3 or 4 is present on another core for the current partition;

any task of security level 2 present on another core has a certification level lower than or equal to its own certification level;

a task having a security level 3 is executed if the following conditions are met:
  no task of security level 4 is present on another core for the current partition;
  any task of security level 3 present on another core has a certification level lower than or equal to its own certification level and, in the event of equality, its identification number is higher than or equal to the others;

a task having a security level 4 is executed if the following conditions are met:
  any task of security level 4 present on another core has a certification level lower than or equal to its own certification level and, in the event of equality, its identification number is strictly higher than the others.

The features of the invention mentioned above, as well as others, will emerge more clearly from a reading of the following description of an example embodiment, said description being given in relation to the accompanying drawings, among which:

Figure 1:
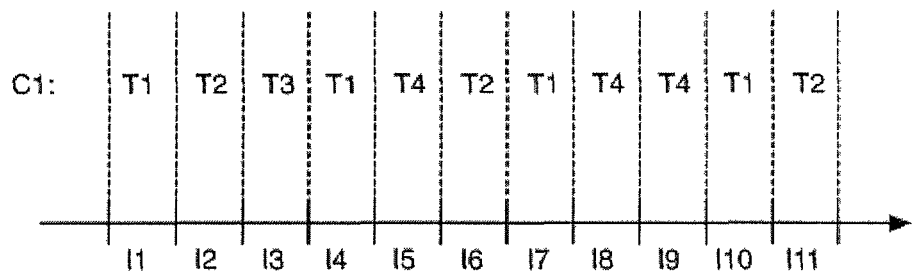
FIG. 1 illustrates a task sequencing in a conventional real-time executive.

FIG. 1 illustrates a sequencing of tasks in a conventional real-time executive executed on a single-core processor. The tasks T1, T2, T3 and T4 are executed alternately on the core C1. The time is divided into successive time slots I1 to I11. Each of these slots represents the time component of a partition in the sense of the partitioning defined above. The time partitioning is generally periodic in time slots of the same duration, but this is not mandatory.

Each task has its own certification level dependent on the development methods used for programming it. Each partition is therefore executed with the certification level associated with the task being executed in this partition. The partitioning system guarantees a time barrier between the various partitions. A partition executing a task with a lower certification level cannot, in the event of malfunctioning of the task, interfere with the execution in another partition of another task, for example with a higher certification level. This is important since a risk of malfunctioning is associated with each certification level. It is therefore important that this risk cannot be increased by the functioning of the other tasks if it is wished to be able to control the global risk related to the use of the system. This is a major security factor.

Figure 2:
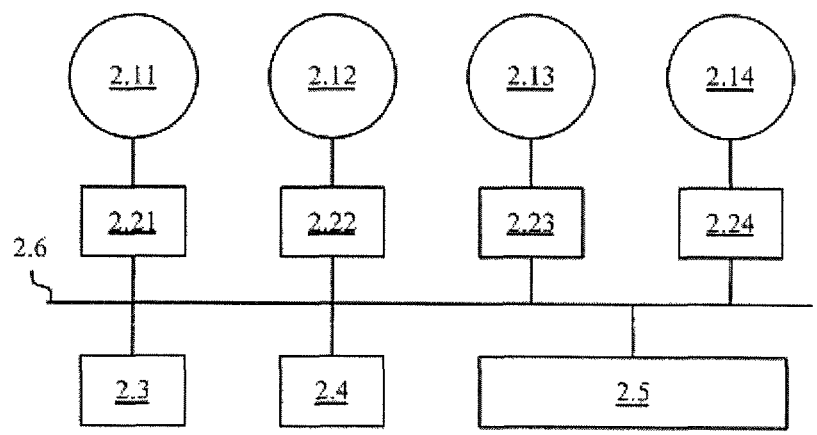
FIG. 2 illustrates a typical multicore processor architecture.

FIG. 2 illustrates a typical multicore processor architecture. Within a same component, there are a plurality of computing units, 2.11 to 2.14. These computing units are called the cores and have approximately the same capacities as a traditional single-core processor. Their number varies between two and eight cores in the processors offered at the present time, but no doubt their number will be called on to increase in the years to come. Typically, these cores are each provided with at least one local memory, 2.21 to 2.24, which they use as a dedicated local working memory. A memory common to all the cores 2.5 is typically present. The component also has a set of modules 2.3, 2.4, dedicated to various operations such as the inputs-outputs of the processor or a dedicated computer unit such as graphics coprocessors. These various modules communicate through a bus 2.6. In particular, access to the shared memory 2.5 is managed by a cache mechanism in the local memories 2.21 to 2.24.

Because of this architecture and the development methods used to design these components, it is not possible at the present time to ensure a barrier between the tasks being executed on the various cores of the processor. For example, a task that is a victim of a malfunctioning on one of the cores may launch a series of memory operations that will have the effect of saturating the bus 2.6. Because of this, the tasks being executed on the other cores may have their functioning disturbed by the malfunctioning of the first task. In such a context, the use of a certification level for the development of each task does not by itself guarantee satisfactory security levels for all the system. The very concept of partitioning based on impermeability of the partitions is called into question.

We have defined the concept of certification level, which is an intrinsic property of a given item of software related to the development methods used during its design. We are going to define another concept, which we refer to as security level. This security level is not an intrinsic property of a program, but a requirement related to the execution of a particular instance of this program in a particular context. It is therefore related to the particular execution, on a particular core, of the task that represents this instance of execution of the software. This security level is related to the critical character of the execution of the particular instance of the task. For the same task, this criticality may change over time. For example, a task of controlling a flap is not very critical when an aircraft is taxiing, but may become so during landing.

The solution developed concerns the concept of partitioning. In particular, the time is always divided into successive time slots. This division is identical over all the cores of the processor. These cores are therefore synchronised in time. Typically, these time slots are identical, but this condition is not essential to the correct functioning of the system.

Figure 3:
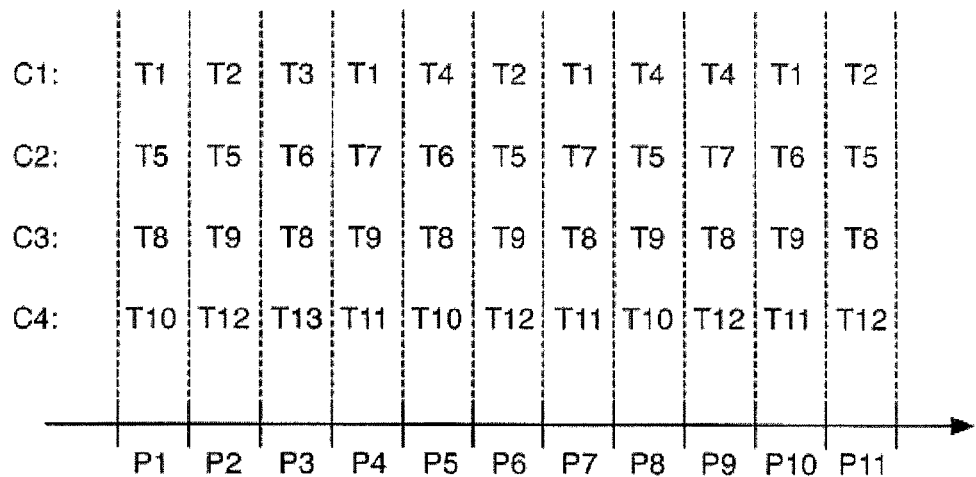
FIG. 3 illustrates the functioning of the system that is the framework of the invention.

FIG. 3 illustrates the functioning of the system that is the framework of the invention. The succession in time of the partitions can be seen therein on the X-axis, P1 to P11. It is assumed that the processor has four cores C1 to C4. For each partition and each core, the occurrence of the task that must be executed in accordance with the planned sequencing has been indicated.

Each of the tasks, or more exactly each of the instances of tasks for each partition and each core, has a certification level and a security level. Since the certification level relates to the development methods used for creating the task, it therefore relates indirectly to its reliability level, that is to say to the probability of a malfunctioning of said task. Since the security level is related to the criticality of such a malfunctioning for this instance of a task in its execution context, it is therefore related to the gravity of the predictable consequences of such a malfunctioning.

In the example embodiment of the invention, the system is based on the certification levels defined in the standard DO-178B intended for the avionics field. These levels are five in number, labelled from A to E. Level E corresponds to a software developed without any special constraints. Any software may therefore, by default, claim certification level E. The certification levels D to A impose increasing quality constraints.

Still in the example embodiment of the invention, the security levels are four in number, labelled from 1 to 4. Security level 1 is the lowest level. It therefore implies that a malfunctioning of the task has no critical impact. According to the impacts of a possible malfunctioning, the security level increases in order to reach the level 4, the highest. Typically, in avionics, this level is attributed to tasks where malfunctioning may create an accident putting the life of the crew and/or passengers at stake. The attribution of the security level to a task may be done by any means. Typically, in the example embodiment, this security level is attributed by an expert to each task according to its context. It is stated here that this level may vary over time, for the same task, for example according to the flight phases. These certification and security levels are particular to the example embodiment. In other embodiments, they could be different in number and bear other names.

Figure 4A:
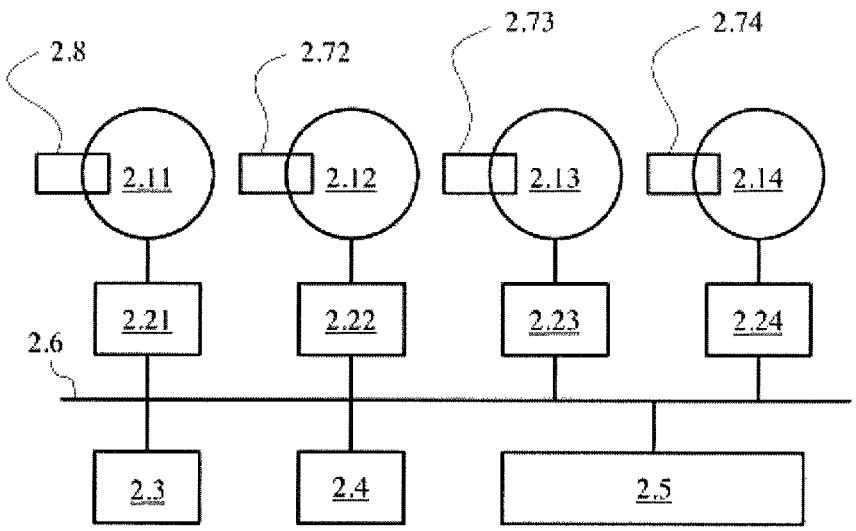
FIGS. 4a and 4b illustrate respectively two embodiments of the module controlling the modules sequencing the processor cores.
Figure 4B:
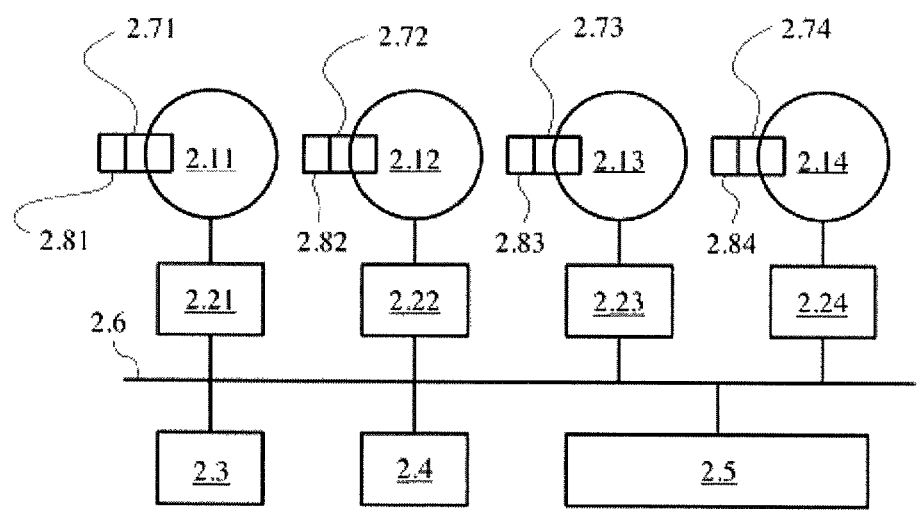

Advantageously, the sequencing method according to the invention is composed of a sequencing module that is executed on each of the cores of the processor. FIGS. 4a and 4b show schematically these sequencing modules 2.71 to 2.74 in a multicore processor architecture similar to that of FIG. 2. The same references represent the same elements. These modules 2.71 to 2.74 can communicate in the form of information exchanges, typically messages. A control instance will take the decision to enable or not the launch of the planned task in the partition on each of the cores 2.11 to 2.14. Two variant implementations can be executed of this control instance.

According to a first embodiment shown in FIG. 4a, referred to as centralised mode, a sequencing module on one of the cores is elected the control instance. In FIG. 4a, this module is the module 2.8 on the core 2.11. This module 2.8 then takes the name of control module and communicates with the other modules 2.72 to 2.74 in order firstly to obtain the information necessary for its decision making and secondly to inform the other modules 2.72 to 2.74 of the decisions made.

According to a second embodiment, referred to as distributed mode, shown in FIG. 4b, each sequencing module 2.71 to 2.74 on each core 2.11 to 2.14 implements the control for its own tasks in a control module 2.81 to 2.84 that is particular to it. All the modules 2.81 to 2.84 then have an equivalent functioning and a control instance is distributed between the various modules. In this embodiment, each module 2.81 to 2.84 communicates with the others in order to obtain the information necessary for its decision making. It then makes its decision concerning its own tasks and it is not necessary to advise the others of this, unlike the first embodiment.

Figure 5:
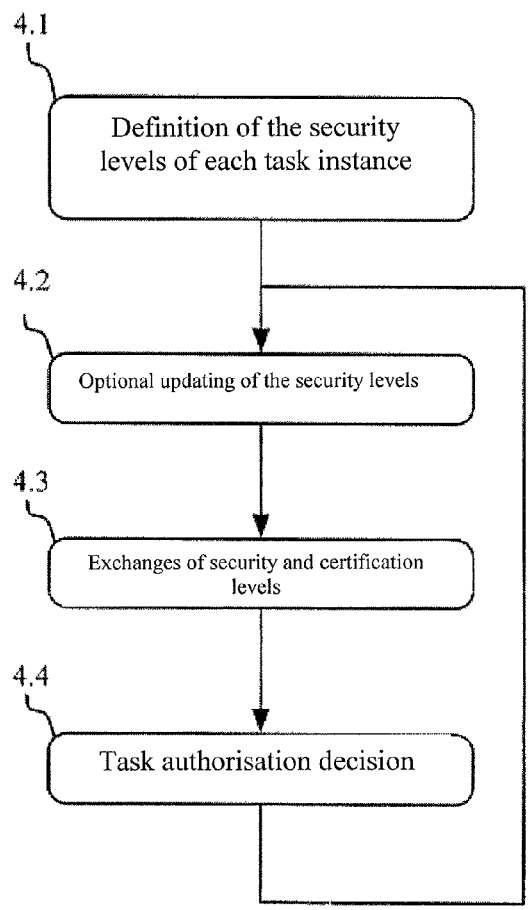
FIG. 5 illustrates the sequencing method according to an example embodiment of the invention.

FIG. 5 illustrates the sequencing method according to the invention aimed at guaranteeing a controlled security level in a system executed on a multicore processor. During the first step 4.1, a security level as we have defined it is attributed to each task instance that is to be executed in a partition on one of the cores of the system. This step is advantageously a step prior to the functioning of the system.

During its functioning, the system repeats the following steps for each partition.

During a step 4.2, optionally, the security level of the tasks getting ready to be launched in the current partition is updated. This is because, since the security level is related to the execution context of the instance of the task, it is advantageous to enable updating thereof according to a possible change in the context for each partition. This updating step constitutes an optional enhancement of the method of the invention.

During step 4.3, an exchange of messages occurs between the various sequencing modules of each core. Each core informs the control instance of the certification and security levels of the task that is getting ready to be sequenced on this core in the current partition. In the case where the control instance is centralised, the message exchange is, for example, an exchange from each sequencing module to the module hosting the control instance. In the case where the control is distributed, each sequencing module informs each of the other modules on each core.

The control instance decides, during a step 4.4, on a launch authorisation for each of the tasks getting ready to be launched on each core. This decision is made according to the certification and security level of the other tasks getting ready to be launched in the same partition.

In the example embodiment, the decisions are made according to the following rules.

A task having a security level 1, that is to say the lowest, is executed if the following conditions are met:
  No task of security level 3 or 4 is present on another core for the current partition.
  Any task of security level 2 present on another core has a certification level lower than or equal to its own certification level.

It should be noted that this rule makes it possible to make tasks with different certification levels cohabit. A task of security level 1 can cohabit with a task of security level 2, each on a core of the processor, provided that its certification level is at least equal to that of the task of security level 2. It is thus sought to not enable the task of security level 1 to degrade the overall certification level of the partition.

A task having a security level 2 is executed if the following conditions are met:
  No task with security level 3 or 4 is present on another core for the current partition.
  Any task of security level 2 present on another core has a certification level lower than or equal to its own certification level.

This rule makes it possible mainly to make the various cores of the tasks with identical certification levels cohabit time-wise. The level 2 partitions having the highest certification levels are executed as well as, if such exist, the partitions of security level 1, but with a higher or equal certification level.

A task having a security level 3 is executed if the following conditions are met:
  No task of security level 4 is present on another core for the current partition.
  Any task of security level 3 present on another core has a certification level lower than or equal to its own certification level. In the event of equality, its identification number is higher than or equal to the others.

This rule involves a new parameter of the tasks, the identification number. This number identifies a task uniquely. If two tasks, on two different cores, have the same identification number, this indicates that it is a case of the same task implemented in the form of parallel processes functioning in at least two cores. This rule means that a task of security level 3 is executed alone on the processor, optionally in a distributed fashion on several cores. No other task is enabled to function in the same partition.

A task having a security level 4 is executed if the following conditions are met:
  Any task of security level 4 present on another core has a certification level lower than or equal to its own certification level. In the event of equality, its identification number is strictly greater than the others.

This rule enables the functioning of a level 4 task only exclusively on a single core. It is no longer permitted here, as was the case at security level 3, to have a task of security level 4 functioning in a distributed manner on several cores. A task of security level 4 is always executed alone in its partition.

The last two rules use the task identifier to implement a method for electing a single task among a set of tasks. A person skilled in the art understands that any other election method can be used, by message exchange, the use of another criterion making it possible to elect independently a single task in a distributed manner. These distributed election algorithms are well known to persons skilled in the art. The use of the task identifier is therefore not necessary for implementing the invention. It would be possible, for example, to use a core number identifier that would also allow an election.

It is also necessary to understand that the rules described are only an example embodiment of the invention. Other rules can be defined aimed at implementing a security policy that may be different according to the number of security levels defined and the context of use of the system.

The invention claimed is:

1. Method for sequencing a set of tasks on a processor having a plurality of execution cores, processor resources being divided into a plurality of partitions, these partitions sharing the time in the form of a succession of time slots synchronously on each core of the processor, the method being executed by a set of sequencing modules implemented on the cores of the processor, a control instance being implemented in at least one of said sequencing modules, said method comprising:

a step implemented whenever an instance of a task in a current partition sharing a core is getting ready to be executed by the core, of preliminary determining a security level related to the critical character of the execution of said instance of said task in the context of said system for the current partition, each task moreover having a certification level intrinsically related to the development methods used during design thereof;

a step of exchanging messages between the various sequencing modules of each core and said control instance, said exchanging step being implemented, whenever an instance of a task is getting ready to be executed by a core in the current partition, by the sequencing module of said core, and being designed to inform the control instance of the certification and security levels of said tasks getting ready to be executed, and a step of determining a launch authorization being implemented whenever an instance of a task is getting ready to be executed by a core in the current partition in order to determine an authorisation to launch said instance, and doing this according to the certification level related to and the security level determining for each task getting ready to be launched in the same partition, wherein the security levels are four in number, and the step of determining a launch authorisation for each of the tasks comprises the following rules:

a task having a security level 1, that is to say the lowest, is executed if the following conditions are met:

no task with security level 3 or 4 is present on another core for the current partition;

any task of security level 2 present on another core has a certification level lower than or equal to its own certification level;

a task having a security level 2 is executed if the following conditions are met:

no task with security level 3 or 4 is present on another core for the current partition;

any task of security level 2 present on another core has a certification level lower than or equal to its own certification level;

a task having a security level 3 is executed if the following conditions are met:

no task of security level 4 is present on another core for the current partition;

any task of security level 3 present on another core has a certification level lower than or equal to its own certification level and, in the event of equality, its identification number is higher than or equal to the others;

a task having a security level 4 is executed if the following conditions are met:

any task of security level 4 present on another core has a certification level lower than or equal to its own certification level and, in the event of equality, its identification number is strictly greater than the others.

2. Method according to claim 1, wherein the method further comprises, for each partition, a step of updating the security level of each task getting ready to be launched according to the execution context of said task.

3. Method according to claim 1, wherein the control instance is centralised in a particular sequencing module on one of the cores and wherein step of exchanging messages between the various sequencing modules of each core and said control instance comprises for each sequencing module a step of sending to this particular sequencing module information concerning the certification level related to and the security level determining for each task to be executed by said sequencing module.

4. Method according to claim 1, wherein the control instance is distributed within the sequencing modules on each core and wherein step of exchanging messages between the various sequencing modules of each core and said control instance comprises for each sequencing module a step of sending to all the sequencing modules information concerning the certification level related to and the security level determining for each task to be executed by said sequencing module.

* * * * *